(12) United States Patent
Murooka et al.

(10) Patent No.: US 8,080,777 B2
(45) Date of Patent: Dec. 20, 2011

(54) OPTICAL DEVICE AND OPTICAL SYSTEM

(75) Inventors: Takashi Murooka, Ashigarakami-gun (JP); Hideyasu Ishibashi, Ashigarakami-gun (JP); Ichiro Amimori, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

(21) Appl. No.: 12/369,371

(22) Filed: Feb. 11, 2009

(65) Prior Publication Data

US 2009/0206240 A1 Aug. 20, 2009

(30) Foreign Application Priority Data

Feb. 14, 2008 (JP) ................. 2008-032624

(51) Int. Cl.
*G02F 1/01* (2006.01)
*G01J 3/50* (2006.01)
*G01J 3/06* (2006.01)
*G01J 3/447* (2006.01)
*G02B 26/08* (2006.01)
*G02B 5/30* (2006.01)

(52) U.S. Cl. ........ 250/225; 250/226; 359/303; 359/489; 356/308; 356/327

(58) Field of Classification Search .......... 250/550, 250/559.09, 206, 216, 227.16, 225, 226; 356/5.14, 33, 308, 322, 327, 451–453, 487, 356/491, 510, 364–370; 359/246, 281, 283, 359/300–304, 352, 371, 389, 437, 464, 465, 359/483, 489, 501

See application file for complete search history.

(56) References Cited

U.S. PATENT DOCUMENTS

2005/0047108 A1*  3/2005  O'Connor et al. ............. 362/19
2010/0103417 A1*  4/2010  Otani et al. .................. 356/364

FOREIGN PATENT DOCUMENTS

| JP | 2971945 B2 | 11/1999 |
| JP | 2000-267127 A | 9/2000 |
| WO | 91/06888 A1 | 5/1991 |

* cited by examiner

*Primary Examiner* — Kevin Pyo
*Assistant Examiner* — Don Williams
(74) *Attorney, Agent, or Firm* — Sughrue Mion, PLLC (57) ABSTRACT

Provided is an optical device, comprising a plurality of polarizers that are arranged along a propagation direction of incident light; a first phase element that is disposed between the plurality of polarizers and that has a phase lag axis forming a prescribed angle relative to transmission axes of the polarizers arranged along the propagation direction; and a second phase element that is disposed between the first phase element and one of the polarizers arranged along the propagation direction, and that provides the incident light with a prescribed phase difference. An angle of the phase lag axis of the second phase element is adjusted such that the optical device transmits light in a prescribed wavelength region in the incident light.

26 Claims, 5 Drawing Sheets

FIG.5 ptical System

OPTICAL DEVICE AND OPTICAL SYSTEM

CROSS REFERENCE TO RELATED APPLICATION

The present application claims priority from a Japanese Patent Application No. 2008-032624 filed on Feb. 14, 2008, the contents of which are incorporated herein by reference.

BACKGROUND

1. Technical Field

The present invention relates to an optical device and an optical system. In particular, the present invention relates to an optical device that transmits light and an optical system using the optical device.

2. Related Art

An adjustable optical filter used as an element for adjusting a ferroelectric liquid crystal substance is known, as in, for example, Japanese Patent No. 2971945. In addition, a wavelength-tunable color filter using liquid crystal is known, as in, for example, Japanese Patent Application Publication No. 2000-267127.

The inventions disclosed in the above documents, however, block light in a wavelength region outside of a prescribed wavelength region. Therefore, these inventions cannot emit light in a desirable spectrum having a smooth spectrum distribution.

SUMMARY

Therefore, it is an object of an aspect of the innovations herein to provide an optical device and an optical system, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary optical device comprises a plurality of polarizers that are arranged along a propagation direction of incident light; a first phase element that is disposed between the plurality of polarizers and that has a phase lag axis forming a prescribed angle relative to transmission axes of the polarizers arranged along the propagation direction; and a second phase element that is disposed between the first phase element and one of the polarizers arranged along the propagation direction, and that provides the incident light with a prescribed phase difference. An angle of the phase lag axis of the second phase element is adjusted such that the optical device transmits light in a prescribed wavelength region in the incident light.

According to a second aspect related to the innovations herein, one exemplary optical device comprises a plurality of polarizers that are arranged along a propagation direction of incident light; and a first phase element that is disposed between the plurality of polarizers arranged along the propagation direction and that has a phase lag axis making a prescribed angle in relation to transmission axes of the polarizers arranged along the propagation path. Light transmission characteristics of the polarizers relating to a polarization direction of light are adjusted such that the optical device transmits light in a prescribed wavelength region in the incident light.

According to a third aspect related to the innovations herein, one exemplary optical system comprises an optical device; an image acquiring section that captures an image of a subject; a detecting section that detects an object showing the subject in the image; a spectrum information storing section that stores a spectrum of light from the subject shown by the object, in association with the object; and a control section that controls a spectral transmission factor of the optical device according to the spectrum stored by the spectrum information storing section in association with the object detected by the detecting section. The optical device includes a plurality of polarizers that are arranged along a propagation direction of incident light; a first phase element that is disposed between the plurality of polarizers and that has a phase lag axis forming a prescribed angle relative to transmission axes of the polarizers arranged along the propagation direction; and a second phase element that is disposed between the first phase element and one of the polarizers arranged along the propagation direction, and that provides the incident light with a prescribed phase difference. The control section adjusts an angle of the phase lag axis of the second phase element according to the spectrum stored by the spectrum information storing section in association with the object detected by the detecting section, such that the optical device transmits light in a prescribed wavelength region in the incident light.

According to a fourth aspect related to the innovations herein, one exemplary optical system comprises an optical device; an image acquiring section that captures an image of a subject; a detecting section that detects an object showing the subject in the image; a spectrum information storing section that stores a spectrum of light from the subject shown by the object, in association with the object; and a control section that controls a spectral transmission factor of the optical device according to the spectrum stored by the spectrum information storing section in association with the object detected by the detecting section. The optical device includes a plurality of polarizers that are arranged along a propagation direction of incident light; and a first phase element that is disposed between the plurality of polarizers and that has a phase lag axis forming a prescribed angle relative to transmission axes of the polarizers arranged along the propagation direction. The control section adjusts light transmission characteristics of the polarizers relating to a polarization direction of light according to the spectrum stored by the spectrum information storing section in association with the object detected by the detecting section, such that the optical device transmits light in a prescribed wavelength region in the incident light.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
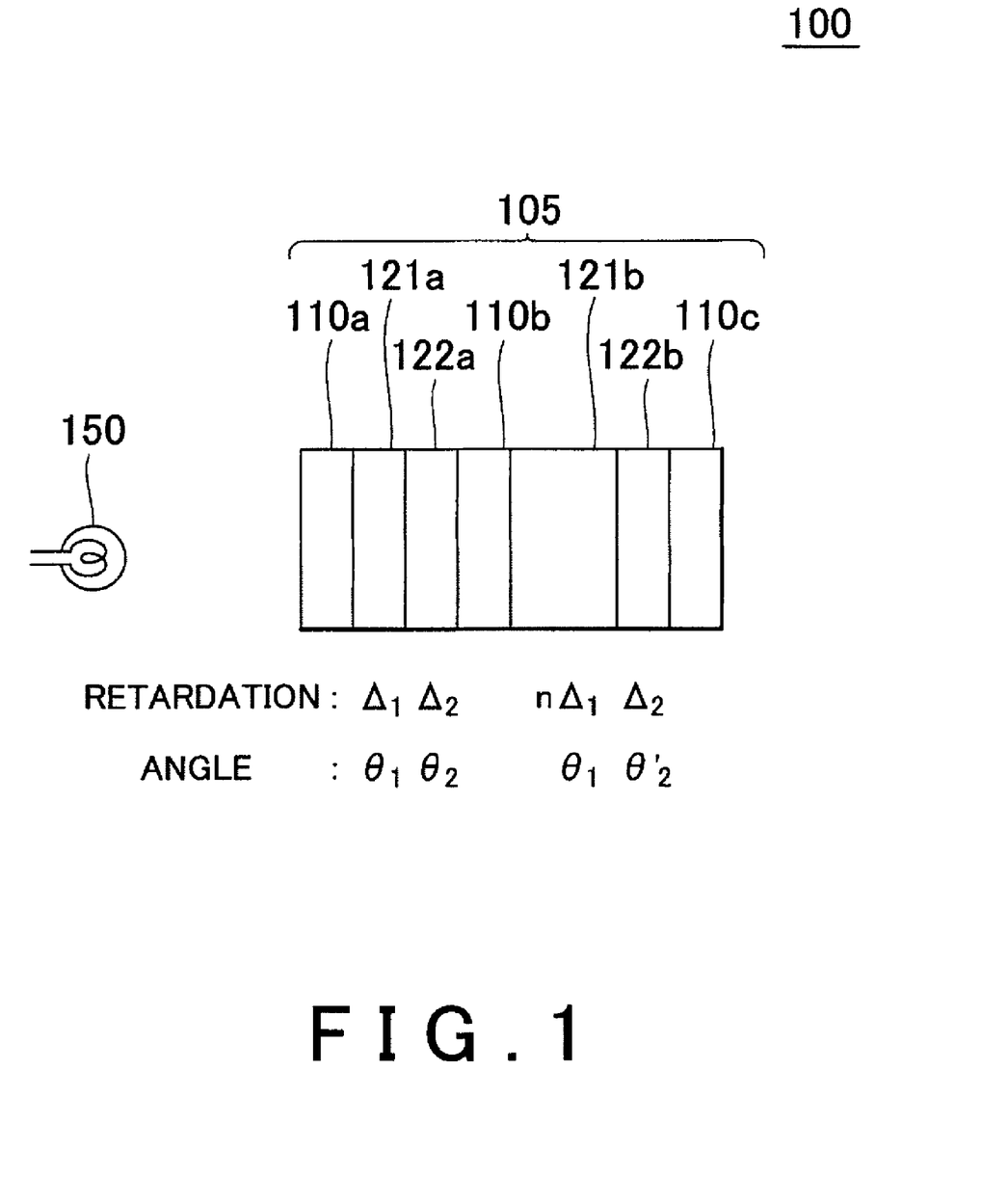
FIG. 1 shows an exemplary optical apparatus 100 according to an embodiment of the present invention.

FIG. 1 shows an exemplary optical apparatus 100 according to an embodiment of the present invention. It is an objective of the optical apparatus 100 of the present embodiment to generate light having a desired spectrum. The optical apparatus 100 is provided with an optical element 105 and a light source 150. The optical element 105 includes a plurality of polarizers 110a, 110b, and 110c (referred to hereinafter collectively as "the polarizers"), a plurality of first phase elements 121a and 121b (referred to hereinafter collectively as "the first phase elements"), and a plurality of second phase elements 122a and 122b (referred to hereinafter collectively as "the second phase elements"). The optical element 105 may function as an optical device in the present invention.

The light source 150 emits incident light to the optical element 105. For example, the light source 150 emits white light. The polarizers 110 are arranged along a propagation direction of the incident light. More specifically, the polarizers 110 are arranged along the direction in which the light from the light source 150 propagates. The light source 150 emits light that includes light polarized in a direction of the transmission axes of the polarizers 110. For example, the light source 150 emits non-polarized light. As another example, the light source 150 may emit light polarized in the direction of the transmission axis of the polarizer 110a.

Each of the first phase elements 121 is provided between a pair of the polarizers 110. The first phase elements 121 are arranged along the propagation direction of the incident light. The first phase elements 121 have phase lag axes that form a prescribed angle with the transmission axes of the polarizers 110 arranged along the propagation direction of the incident light. For example, the phase lag axes of the first phase element 121a and the first phase element 121b are at an angle θ1 in relation to the transmission axes of the polarizers 110. If the retardation caused by the first phase element 121a is $\Delta_1$, the retardation caused by the first phase element 121b may be $n\Delta_1$, which is an integer multiple of $\Delta_1$. The retardation caused by the first phase element 121b is not limited to an integer multiple of $\Delta_1$, and can be any adjusted value.

Each second phase element 122 is disposed between a first phase element 121 and a polarizer 110 arranged along the propagation direction of the incident light. The second phase elements 122 provide the incident light with a prescribed phase difference. Here, the retardation caused by the second phase element 122a and the second phase element 122b is set as $\Delta_2$. The phase lag axis of the second phase element 122a has an angle of $\theta_2$ in relation to the transmission axes of the polarizers 110.

The polarizers 110, the first phase elements 121, and the second phase elements 122 are arranged along the propagation direction of the incident light as described above. The angle $\theta_2$ of the phase lag axes of the second phase elements 122 can be adjusted such that the optical element 105 transmits light in a prescribed wavelength region in the incident light. The phase difference, e.g. $\Delta_1$, provided to the incident light by the first phase elements 121 can be adjusted to transmit light in a prescribed wavelength region included in the incident light. The transmission axes of the polarizers 110 are in substantially the same direction as each other. For example, the second phase elements 122 may be half-wavelength plates. The phase lag axes of the first phase elements 121 may form an angle of 45 degrees in relation to the transmission axes of the polarizers 110, i.e. $\theta_1$=45 degrees.

In this way, three polarizers 110 are arranged along the propagation direction of the incident light. Each first phase element 121 is disposed between a pair of the polarizers 110, and each second phase element 122 is disposed following a first phase element 121 and immediately proceeding a polarizer 110 in the propagation direction. Three or more polarizers 110 may be arranged along the propagation direction of the incident light.

The angle of the phase lag axis of each second phase element 122 can be adjusted according to the amount of light in a prescribed wavelength region included in the incident light to be transmitted. Instead, the phase delay provided to the incident light by each first phase element 121 can be adjusted according to the amount of light in a prescribed wavelength region included in the incident light to be transmitted. In this way, the spectral transmission factor of the optical element 105 can be adjusted to a prescribed value.

Figure 2:
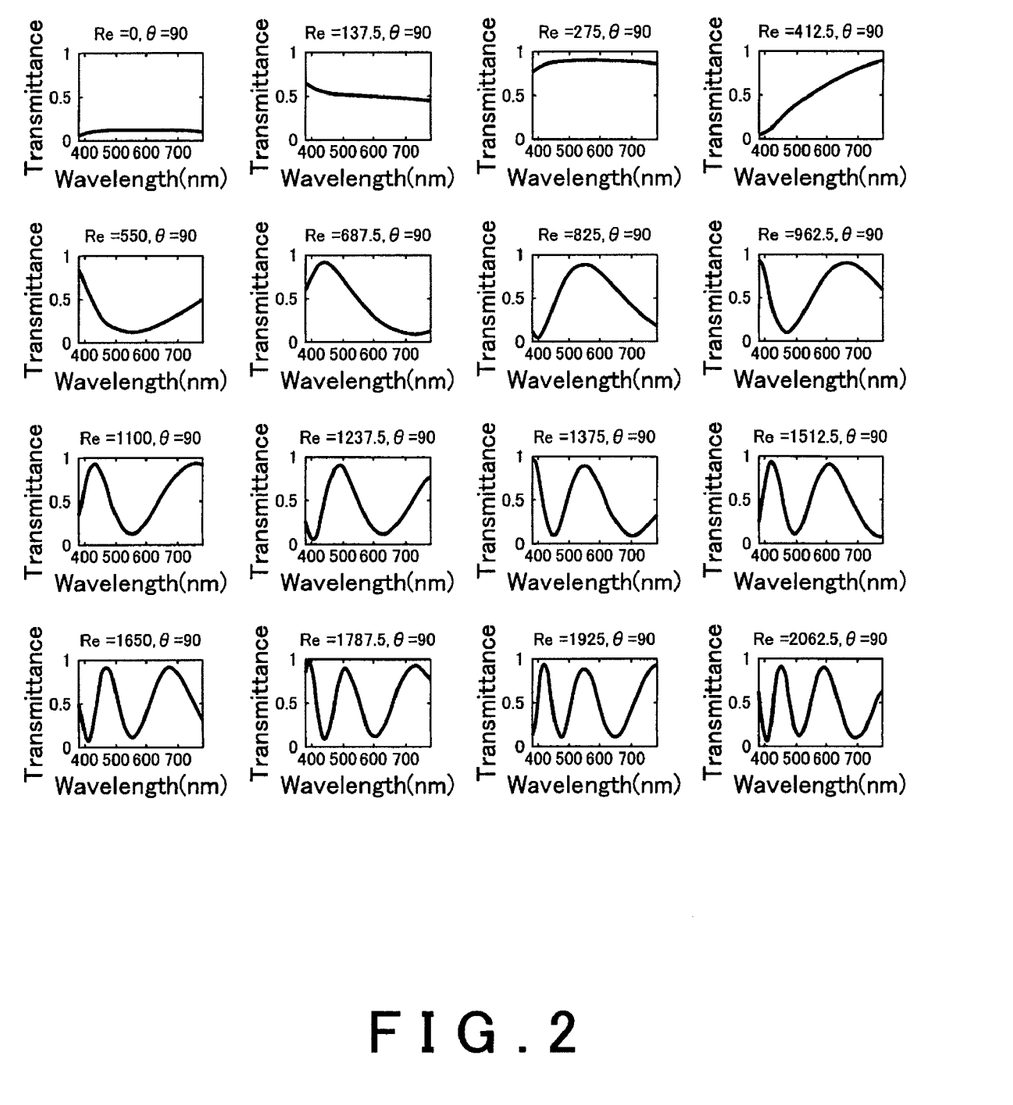
FIG. 2 shows exemplary spectral transmission factors of one optical unit formed by the polarizer 110a, the first phase element 121a, the second phase element 122a, and the polarizer 110b.

FIG. 2 shows exemplary spectral transmission factors of one optical unit formed by the polarizer 110a, the first phase element 121a, the second phase element 122a, and the polarizer 110b. The Stokes parameters $(S_0, S_1, S_2, S_3)$ of the light emitted after being transmitted through the one optical unit can be expressed by Expression 1. In Expression 1, the Stokes parameters of the light incident to the optical unit are set to be $(1, 0, 0, 0)$.

$$\begin{bmatrix} S_0 \\ S_1 \\ S_2 \\ S_3 \end{bmatrix} = \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} \cdot \begin{bmatrix} 1 & 0 & 0 & 0 \\ 0 & \cos2\theta_2 & -\sin2\theta_2 & 0 \\ 0 & \sin2\theta_2 & \cos2\theta_2 & 0 \\ 0 & 0 & 0 & 1 \end{bmatrix} \cdot$$

$$\begin{bmatrix} 1 & 0 & 0 & 0 \\ 0 & 1 & 0 & 0 \\ 0 & 0 & \cos\Delta_2 & \sin\Delta_2 \\ 0 & 0 & -\sin\Delta_2 & \cos\Delta_2 \end{bmatrix} \cdot \begin{bmatrix} 1 & 0 & 0 & 0 \\ 0 & \cos2\theta_2 & \sin2\theta_2 & 0 \\ 0 & -\sin2\theta_2 & \cos2\theta_2 & 0 \\ 0 & 0 & 0 & 1 \end{bmatrix} \cdot$$

$$\begin{bmatrix} 1 & 0 & 0 & 0 \\ 0 & \cos2\theta_1 & -\sin2\theta_1 & 0 \\ 0 & \sin2\theta_1 & \cos2\theta_1 & 0 \\ 0 & 0 & 0 & 1 \end{bmatrix} \cdot \begin{bmatrix} 1 & 0 & 0 & 0 \\ 0 & 1 & 0 & 0 \\ 0 & 0 & \cos\Delta_1 & \sin\Delta_1 \\ 0 & 0 & -\sin\Delta_1 & \cos\Delta_1 \end{bmatrix} \cdot$$

$$\begin{bmatrix} 1 & 0 & 0 & 0 \\ 0 & \cos2\theta_1 & \sin2\theta_1 & 0 \\ 0 & -\sin2\theta_1 & \cos2\theta_1 & 0 \\ 0 & 0 & 0 & 1 \end{bmatrix} \cdot$$

$$\frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} \cdot \begin{bmatrix} 1 \\ 0 \\ 0 \\ 0 \end{bmatrix}$$

Expression 1

The graphs of FIG. 2 show the spectral transmission factors calculated from the intensity of the emitted light obtained from Expression 1 when $\Delta_1$ increases by unit multiples of 137.5 nm with the second phase element 122a being λ/2 plate and $\theta_2$ fixed at 80 degrees. Here, the reference wavelength λ is 550 nm.

The value of Re written above each graph of a spectral transmission factor represents the retardation value. For example, the graph in the upper left corner shows a spectral transmission factor when $\theta_2=80$ and $\Delta_1=0$, and the graph immediately to the right of this graph shows a spectral transmission factor when $\theta_2=80$ and $\Delta_1=137.5$ nm.

Figure 3:
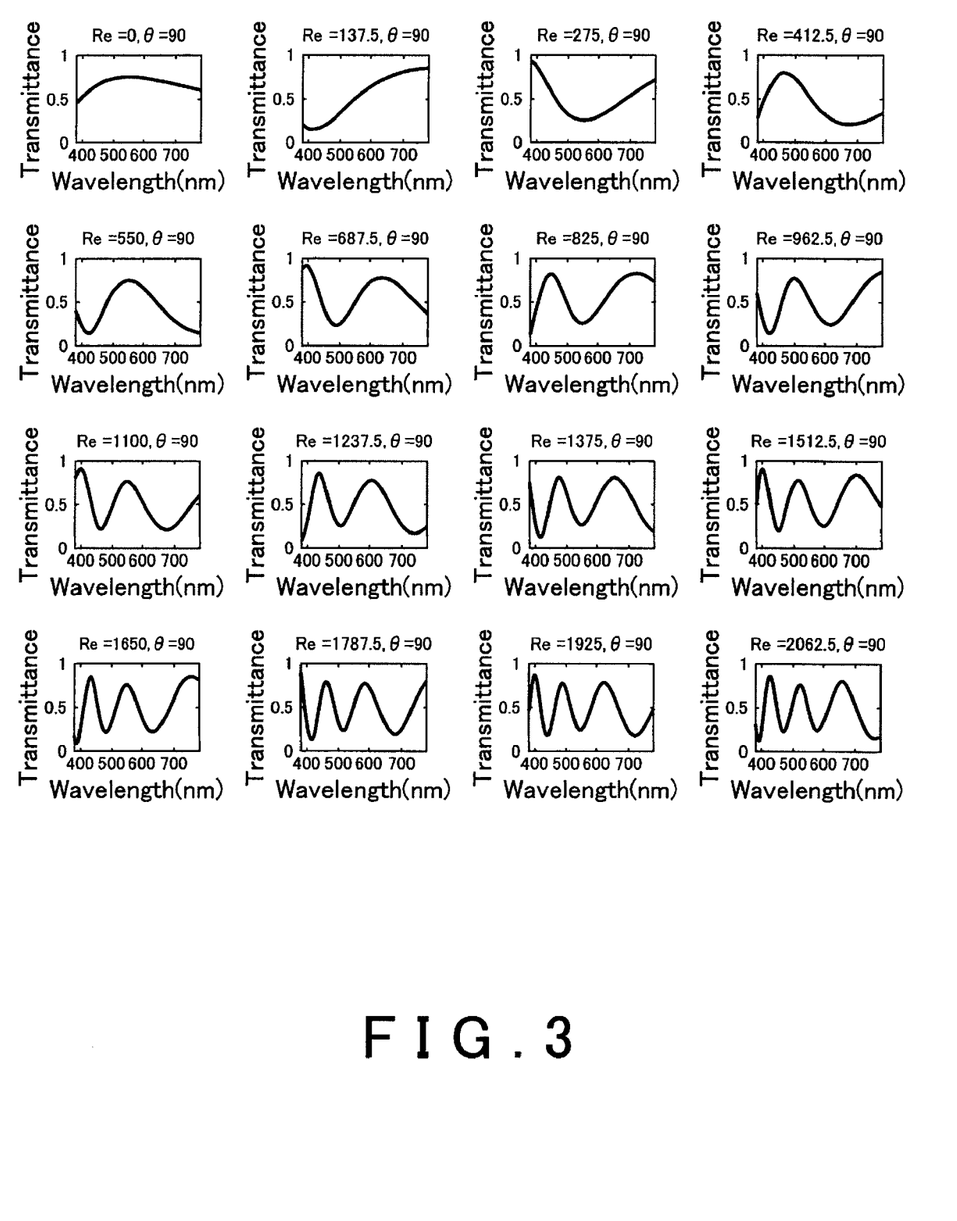
FIG. 3 shows exemplary spectral transmission factors of the one optical unit when $\theta_2$ is fixed at 60 degrees.

FIG. 3 shows exemplary spectral transmission factors of the one optical unit when $\theta_2$ is fixed at 60 degrees. In the graphs of FIG. 3, the optical unit uses different values of $\theta_2$ than in the graphs of FIG. 2. The reference wavelength $\lambda$ is set to 550 nm, which is the same as in FIG. 2.

More specifically, the graphs of FIG. 3 show the spectral transmission factors calculated from the intensity of the emitted light obtained from Expression 1 when $\Delta_1$ increases by unit multiples of 137.5 nm with the second phase element 122a being a $\lambda/2$ plate and $\theta_2$ fixed at 60 degrees. In FIG. 3 as well, the value of Re written above each graph of a spectral transmission factor represents the retardation value. For example, the graph in the upper left corner shows a spectral transmission factor when $\theta_2=60$ and $\Delta_1=0$, and the graph immediately to the right of this graph shows a spectral transmission factor when $\theta_2=60$ and $\Delta_1=137.5$ nm.

Figure 4:
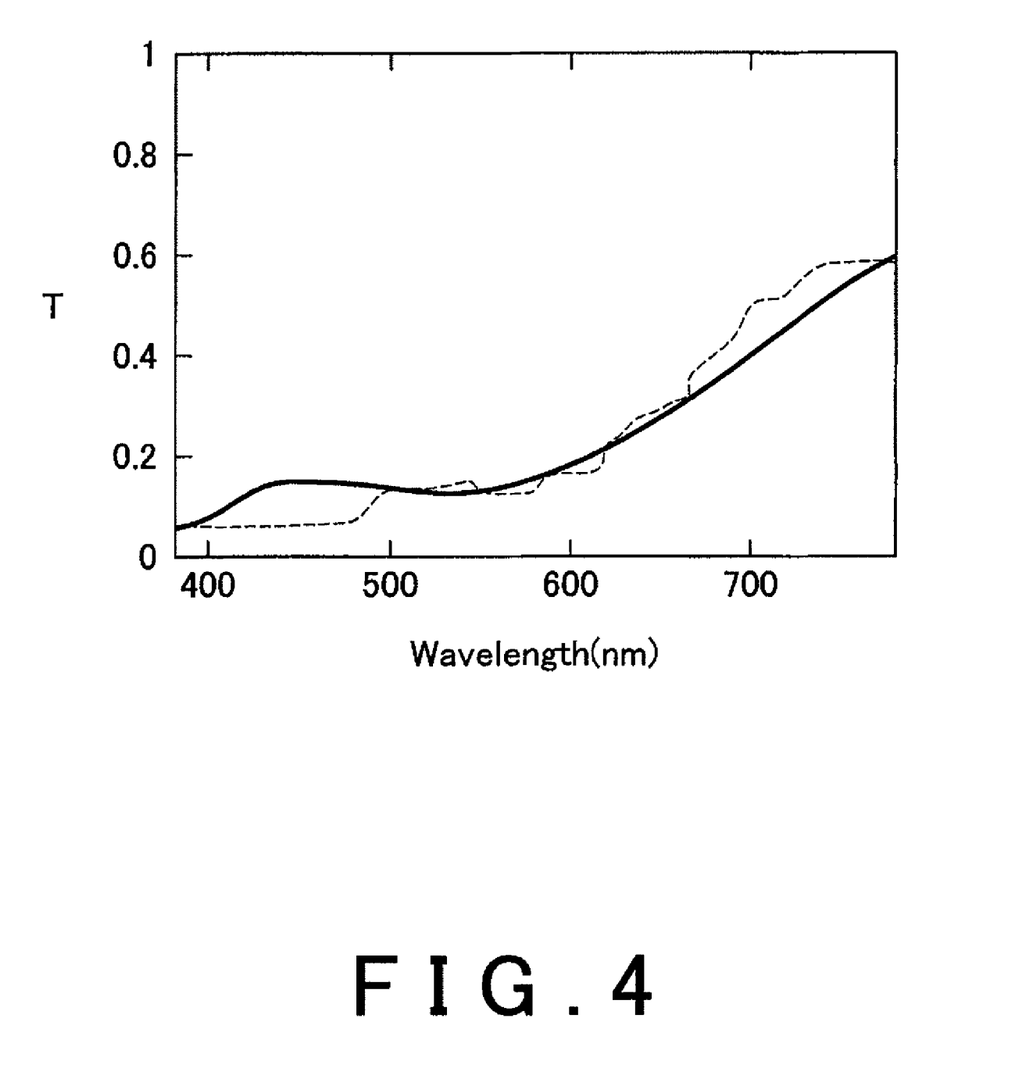
FIG. 4 shows an exemplary spectral transmission factor obtained by two optical units.

FIG. 4 shows an exemplary spectral transmission factor obtained by two optical units. In FIG. 4, the solid line shows a spectral transmission factor of an optical element 105 obtained by connecting two optical units in series in the propagation direction of the incident light. The two optical units used are (i) the optical unit having the spectral transmission factor shown by the graph in the upper right corner of FIG. 2, i.e. the spectral transmission factor where $\theta_2=80$ and $\Delta_1=412.5$ nm, and (ii) the optical unit having the spectral transmission factor shown by the third graph from the right in the top row of FIG. 3, i.e. the spectral transmission factor where $\theta_2=60$ and $\Delta_1=275$ nm.

In FIG. 4, the dotted line shows the spectral intensity of light from the skin of an animal adapted to the scale of the spectral transmission factor. Accordingly, when non-polarized white light is input from the light source 150 into an optical device formed by a combination of two optical units having the spectral transmission factors shown above, the optical apparatus 100 can substantially reproduce a spectrum of light from the skin of an animal. It goes without saying that light in a prescribed spectrum can be reproduced by changing the combination of $\theta_2$ and $\Delta_1$ according to the degree of polarization and the spectral intensity of the incident light from the light source 150.

The transmission axis of each polarizer 110 may be oriented in a different direction. For example, at least one of two polarizers 110 connected in series in the propagation direction of the incident light may be in a cross-nichols relation. Furthermore, the second phase elements 122 need not be provided, or may have a retardation of zero. At least one of (i) the angles of the transmission axes of the polarizers 110 and (ii) the phase difference provided to the incident light by the first phase elements 121 may be adjusted such that light in a prescribed wavelength region in the incident light is transmitted by the optical element 105.

In other words, in place of or in addition to adjusting the angles of the second phase elements 122, the light transmission characteristics of the plurality of polarizers 110 in the propagation direction of the light may be adjusted such that the optical element 105 transmits light in a prescribed wavelength region in the incident light. For example, angles other than a perpendicular or parallel angle may be used for the relative angle of the transmission axis of each of the polarizers 110 arranged in series along the propagation direction of the incident light. In this way, the angle between the transmission axis of a certain polarizer 110 and the transmission axis of a different polarizer 110 may be adjusted such that the optical element 105 transmits light in a prescribed wavelength region in the incident light.

As another example, the angle between the transmission axis of at least one polarizer 110 and the propagation direction of the incident light may be adjusted such that the optical element 105 transmits light in a prescribed wavelength region in the incident light. For example, the transmission axis of at least one polarizer 110 may be adjusted to be in a plane that is not perpendicular to the propagation direction of the incident light, such that the optical element 105 transmits light in a prescribed wavelength region in the incident light. More specifically, the transmission axis of one or more polarizers 110 may be set to be diagonal to the direction in which the incident light moves, such that the direction of the transmission axis of the one or more polarizers 110 forms an angle that is not perpendicular to the direction in which the incident light moves.

As yet another example, the extinction ratio of at least one of the polarizers 110 may be lower than a preset value, such that the optical element 105 transmits light in a prescribed wavelength region in the incident light. For example, one or more of the polarizers 110 may have an extinction ratio of 1:10. The preset ratio is obviously not limited to 1:10, and may be determined according to the desired spectrum of the light output from the optical apparatus 100. Furthermore, in place of or in addition to adjusting the angles of the second phase elements 122, depolarizers, which at least partially depolarize the polarized light propagated between the polarizer 110a and the polarizer 110b or between the polarizer 110b and the polarizer 110c, may be arranged between the above polarizers 110 such that the optical element 105 transmits light in a prescribed wavelength region in the incident light.

A plurality of optical elements 105 formed by the polarizers 110, the first phase elements 121, and the second phase elements 122 may be arranged in a matrix. For example, a plurality of the optical elements 105 may be arranged in a matrix on a flat surface perpendicular to the propagation direction of the incident light, thereby forming a single optical device. Using a plurality of the optical elements 105 enables reproduction of light in spectrums that are 2-dimensionally different.

Since the spectral transmission factor of the optical element 105 can be freely adjusted, the optical element 105 can be used as a color filter in an image capturing system or in a display device. For example, the optical element 105 can be used in a medical diagnostic system that obtains an image in which colors are accurately reproduced without relying on an observable light source, or can be used as a color filter for a shopping catalog.

Figure 5:
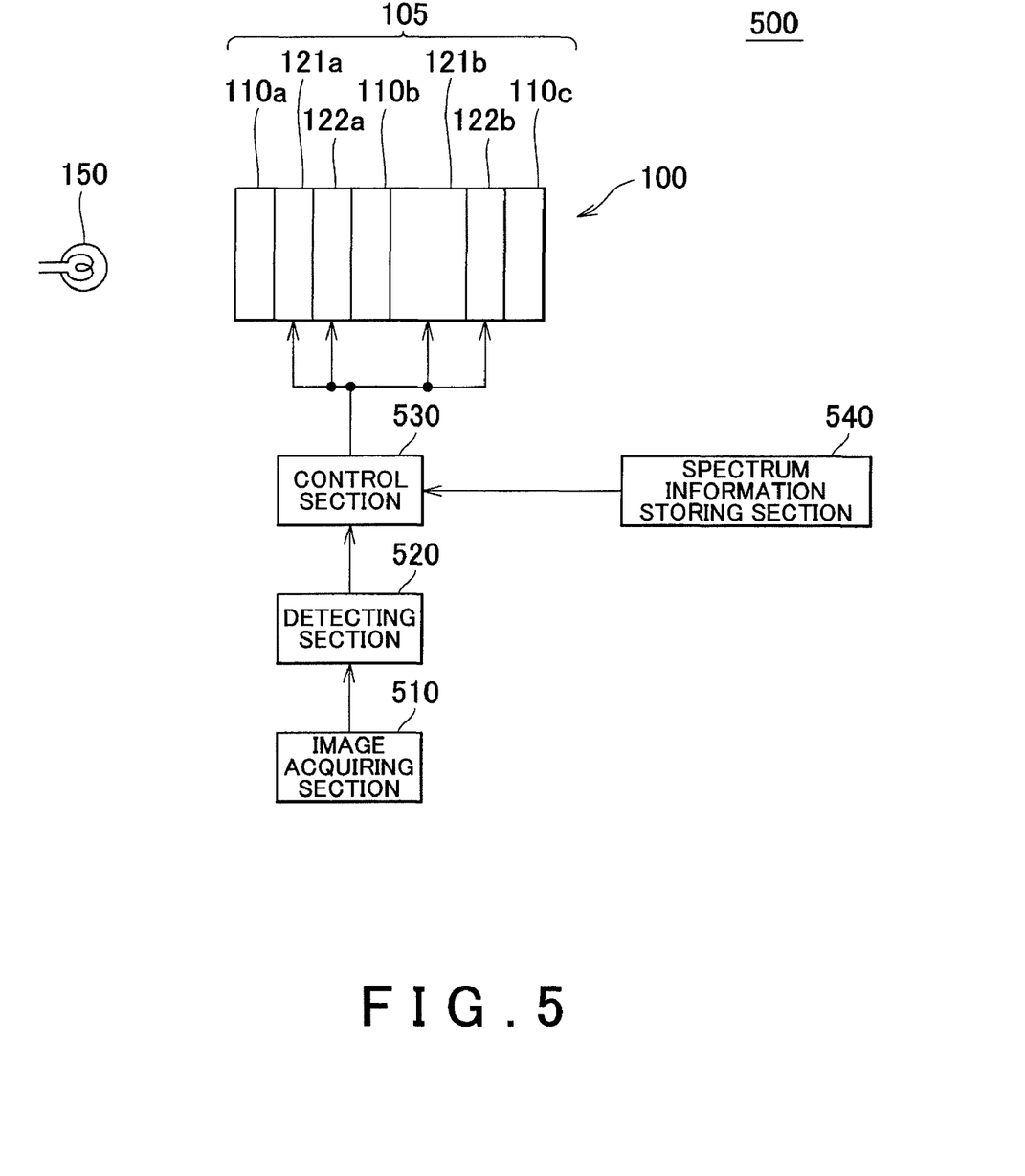
FIG. 5 shows an exemplary configuration of an optical system 500.

FIG. 5 shows an exemplary configuration of an optical system 500. The optical system 500 includes the optical apparatus 100 described in relation to FIGS. 1 to 4, an image acquiring section 510, a detecting section 520, a spectrum information storing section 540, and a control section 530.

The image acquiring section 510 acquires an image of a subject. The image may be a captured image of the subject. The detecting section 520 detects an object showing the subject included in the image. The detecting section 520 may detect the object using object matching.

The spectrum information storing section 540 stores a spectrum of light from the subject shown by the object, in association with the object. For example, the spectrum information storing section 540 stores a spectrum of light from skin of an animal in association with the object showing the skin of the animal. The control section 530 controls the spectral transmission factor of the optical apparatus 100 according to the spectrum stored in the spectrum information storing section 540 in association with the object detected by the detecting section 520. More specifically, the control section 530 controls the spectral transmission factor of the optical apparatus 100 to emit the light in the spectrum stored by the spectrum information storing section 540 in association with the object detected by the detecting section 520.

The spectral transmission factor of the optical apparatus 100 can be controlled by adjusting $\theta_2$ and $\Delta_1$, as described in relation to FIGS. 1 to 4. Accordingly, the control section 530 controls $\theta_2$ and $\Delta_1$ such that the optical apparatus 100 emits light in the spectrum stored by the spectrum information storing section 540.

The first phase elements 121 may be liquid crystal elements that can control the retardation using an electric field. In this case, the control section 530 uses an electric field to control the retardation of the first phase elements 121 according to the spectrum stored by the spectrum information storing section 540 in association with the object detected by the detecting section 520. The second phase elements 122 may be rotatable around the propagation axis of the incident light. In this case, the control section 530 may adjust the phase lag axes of the second phase elements 122 by rotating the second phase elements 122 according to the spectrum stored by the spectrum information storing section 540 in association with the object detected by the detecting section 520.

In other words, the control section 530 adjusts the angles of the phase lag axes of the second phase elements 122 according to the spectrum stored by the spectrum information storing section 540 in association with the object detected by the detecting section 520, such that the optical element 105 transmits light in a prescribed wavelength region in the incident light. The control section 530 may further adjust the phase difference provided to the incident light by the first phase elements 121 according to the spectrum stored by the spectrum information storing section 540 in association with the object detected by the detecting section 520, such that the optical element 105 transmits light in a prescribed wavelength region in the incident light.

If the light transmission characteristics of the polarizers 110 can be adjusted in the manner described above, the control section 530 may adjust the optical characteristics of the polarizers in relation to the polarization direction of the light, according to the spectrum stored by the spectrum information storing section 540 in association with the object detected by the detecting section 520, such that the optical element 105 transmits light in a prescribed wavelength region in the incident light. More specifically, the control section 530 adjusts (i) the angle formed between the transmission axis of a certain polarizer 110 and the transmission axis of another polarizer 110, (ii) the angle formed by the transmission axis of at least one polarizer 110 and the propagation direction of the incident light, and (iii) the extinction ratio of at least one polarizer 110.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An optical device, comprising:
   a plurality of polarizers that are arranged along a propagation direction of incident light;
   a first phase element that is disposed between the plurality of polarizers and that has a phase lag axis forming a prescribed angle relative to transmission axes of the polarizers arranged along the propagation direction; and
   a second phase element that is disposed between the first phase element and one of the polarizers arranged along the propagation direction, and that provides the incident light with a prescribed phase difference, wherein
   an angle of the phase lag axis of the second phase element is adjusted such that the optical device transmits light in a prescribed wavelength region in the incident light, and wherein
   three or more of the polarizers are arranged along the propagation direction of the incident light,
   each of a plurality of the first phase elements is disposed respectively between a pair of the three or more polarizers,
   each of a plurality of the second phase elements is disposed respectively at a position immediately preceding one of the three or more polarizers and following one of the first phase elements, relative to the propagation direction.

2. The optical device according to claim 1, wherein the plurality of polarizers each have a transmission axis in substantially the same direction as each other.

3. The optical device according to claim 1, wherein the second phase element is a ½ wavelength plate.

4. The optical device according to claim 1, wherein the phase lag axis of the first phase element forms an angle of 45 degrees relative to the transmission axes of the polarizers.

5. The optical device according to claim 1, wherein the phase difference provided to the incident light by the first phase element is also adjusted such that the optical device transmits light in the prescribed wavelength region in the incident light.

6. The optical device according to claim 1, wherein the angle of the phase lag axis of each of the plurality of second phase elements is adjusted according to a transmission amount, which is a desired amount of transmitted light in a prescribed wavelength region in the incident light.

7. The optical device according to claim 1, wherein the delay amount provided to the incident light by each of the plurality of first phase elements is adjusted according to a transmission amount, which is a desired amount of transmitted light in a prescribed wavelength region in the incident light.

8. The optical device according to claim 1, wherein a plurality of optical elements formed of the polarizers, the first phase elements, and the second phase elements are arranged in a matrix.

9. The optical device according to claim 1, wherein light transmission characteristics of the polarizers relating to a polarization direction of light are also adjusted such that the optical device transmits light in the prescribed wavelength region in the incident light.

10. The optical device according to claim 1, wherein an angle between the transmission axis of a certain polarizer and the transmission axis of another polarizer is adjusted such that the optical device transmits light in the prescribed wavelength region in the incident light.

11. The optical device according to claim 1, wherein
an angle between the transmission axis of at least one of the polarizers and the propagation direction of the incident light is adjusted such that the optical device transmits light in the prescribed wavelength region in the incident light.

12. The optical device according to claim 1, wherein
the transmission axis of at least one of the polarizers is adjusted to be in a plane that is not perpendicular to the propagation direction of the incident light, such that the optical device transmits light in the prescribed wavelength region in the incident light.

13. The optical device according to claim 1, wherein
an extinction ratio of at least one of the polarizers is lower than a preset value such that the optical device transmits light in the prescribed wavelength region in the incident light.

14. The optical device according to claim 1, wherein
the first phase element is a liquid crystal element that can control the retardation using an electric field.

15. An optical device, comprising:
a plurality of polarizers that are arranged along a propagation direction of incident light;
a first phase element that is disposed between the plurality of polarizers arranged along the propagation direction and that has a phase lag axis making a prescribed angle in relation to transmission axes of the polarizers arranged along the propagation path, and
a second phase element that is disposed between the first phase element and one of the polarizers arranged along the propagation direction, and that provides the incident light with a prescribed phase difference, wherein
light transmission characteristics of the polarizers relating to a polarization direction of light are adjusted such that the optical device transmits light in a prescribed wavelength region in the incident light, and wherein
three or more of the polarizers are arranged along the propagation direction of the incident light,
each of a plurality of the first phase elements is disposed respectively between a pair of the three or more polarizers,
each of a plurality of the second phase elements is disposed respectively at a position immediately preceding one of the three or more polarizers and following one of the first phase elements, relative to the propagation direction.

16. The optical device according to claim 15, wherein
an angle between the transmission axis of a certain polarizer and the transmission axis of another polarizer is adjusted such that the optical device transmits light in the prescribed wavelength region in the incident light.

17. The optical device according to claim 15, wherein
an angle between the transmission axis of at least one of the polarizers and the propagation direction of the incident light is adjusted such that the optical device transmits light in the prescribed wavelength region in the incident light.

18. The optical device according to claim 17, wherein
the transmission axis of at least one of the polarizers is adjusted to be in a plane that is not perpendicular to the propagation direction of the incident light, such that the optical device transmits light in the prescribed wavelength region in the incident light.

19. The optical device according to claim 15, wherein
an extinction ratio of at least one of the polarizers is lower than a preset value such that the optical device transmits light in the prescribed wavelength region in the incident light.

20. The optical device according to claim 15, wherein
a phase difference provided to the incident light by the first phase element is adjusted such that the optical device transmits light in the prescribed wavelength region in the incident light.

21. The optical device according to claim 15, wherein
the first phase element is a liquid crystal element that can control the retardation using an electric field.

22. An optical system, comprising:
an optical device;
an image acquiring section that captures an image of a subject;
a detecting section that detects an object showing the subject in the image;
a spectrum information storing section that stores a spectrum of light from the subject shown by the object, in association with the object; and
a control section that controls a spectral transmission factor of the optical device according to the spectrum stored by the spectrum information storing section in association with the object detected by the detecting section, wherein
the optical device includes:
a plurality of polarizers that are arranged along a propagation direction of incident light;
a first phase element that is disposed between the plurality of polarizers and that has a phase lag axis forming a prescribed angle relative to transmission axes of the polarizers arranged along the propagation direction; and
a second phase element that is disposed between the first phase element and one of the polarizers arranged along the propagation direction, and that provides the incident light with a prescribed phase difference, and
the control section adjusts an angle of the phase lag axis of the second phase element according to the spectrum stored by the spectrum information storing section in association with the object detected by the detecting section, such that the optical device transmits light in a prescribed wavelength region in the incident light.

23. The optical system according to claim 22, wherein
the control section also adjusts the phase difference provided to the incident light by the first phase element according to the spectrum stored by the spectrum information storing section in association with the object detected by the detecting section, such that the optical device transmits light in a prescribed wavelength region in the incident light.

24. The optical system according to claim 22, wherein
the detecting section detects the object using object matching.

25. An optical system, comprising:
an optical device;
an image acquiring section that captures an image of a subject;
a detecting section that detects an object showing the subject in the image;
a spectrum information storing section that stores a spectrum of light from the subject shown by the object, in association with the object; and
a control section that controls a spectral transmission factor of the optical device according to the spectrum stored by the spectrum information storing section in association with the object detected by the detecting section, wherein the optical device includes:
- a plurality of polarizers that are arranged along a propagation direction of incident light; and
- a first phase element that is disposed between the plurality of polarizers and that has a phase lag axis forming a prescribed angle relative to transmission axes of the polarizers arranged along the propagation direction, and the control section adjusts light transmission characteristics of the polarizers relating to a polarization direction of light according to the spectrum stored by the spectrum information storing section in association with the object detected by the detecting section, such that the optical device transmits light in a prescribed wavelength region in the incident light.

26. The optical system according to claim 25, wherein the detecting section detects the object using object matching.

* * * * *